(12) United States Patent
Jeon

(10) Patent No.: US 6,734,391 B2
(45) Date of Patent: May 11, 2004

(54) METHOD AND APPARATUS FOR CUTTING NONMETALLIC SUBSTRATE

(75) Inventor: Baek-Kyun Jeon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/302,656

(22) Filed: Nov. 22, 2002

(65) Prior Publication Data

US 2003/0146197 A1 Aug. 7, 2003

(30) Foreign Application Priority Data

Feb. 2, 2002 (KR) .......................................... 2002-6009

(51) Int. Cl.[7] .......................... B23K 26/38; B23K 26/40
(52) U.S. Cl. ............................ 219/121.72; 219/121.84
(58) Field of Search ..................... 219/121.65–121.72, 219/121.76, 121.77, 121.82, 121.84

(56) References Cited

U.S. PATENT DOCUMENTS

| | | | | |
|---|---|---|---|---|
| 5,138,131 A | * | 8/1992 | Nishikawa et al. | .... 219/121.67 |
| 6,407,360 B1 | * | 6/2002 | Choo et al. | ............ 219/121.67 |
| 6,563,082 B2 | * | 5/2003 | Terada et al. | .......... 219/121.72 |

* cited by examiner

*Primary Examiner*—Samuel M. Heinrich
(74) *Attorney, Agent, or Firm*—Cantor Colburn LLP (57) ABSTRACT

A method and apparatus for cutting a nonmetallic substrate capable of reducing steps and time for cutting a nonmetallic substrate and contaminants of the substrate. An initial crack is previously formed on a nonmetallic substrate by applying laser beams and coolant on the nonmetallic substrate and a scribe crack is formed on the nonmetallic substrate by applying the laser beams to the initial crack. The nonmetallic substrate is cut along the scribe crack by rapidly heating and cooling the portion of the scribe crack using the laser beams and coolant.

19 Claims, 13 Drawing Sheets

METHOD AND APPARATUS FOR CUTTING NONMETALLIC SUBSTRATE

BACKGROUND OF THE INVENTION

1. Field of the Invention

The present invention relates to a method and an apparatus for cutting a nonmetallic substrate, and more particularly to a method and an apparatus for cutting a nonmetallic substrate using a laser beam.

2. Description of the Related Art

Semiconductor devices having a high integration and a high effectiveness have been developed as a technology of a semiconductor thin film process has been improved. The semiconductor thin film process has affected a development of an LCD (Liquid Crystal Display) that displays an image using a liquid crystal. The semiconductor devices and LCDs are disposed on a nonmetallic substrate, for example, a silicon substrate or a glass substrate.

Semiconductor devices are manufactured by forming semiconductor chips on a silicon substrate, separating the semiconductor chips from each other, and packaging the semiconductor chips. LCDs are manufactured by forming two or more cells on a glass substrate (referred to as a "mother board"), separating the cells from each other, and assembling the LCD.

The mother board is brittle in comparison with the silicon substrate because the mother board does not have a crystalline structure such as that of the silicon substrate. Hence, the mother board may be easily fractured by a minute crack that occurs at an edge portion of the glass substrate during the separating process.

FIGS. 1A to 1E are schematic views showing a conventional method for cutting a glass substrate.

Referring to FIGS. 1A to 1E, a diamond cutter 10 includes a rotating disc 1 having a diamond 1a disposed at an end portion of a circle shape thereof, a rotating part 2 connected to a central portion of the rotating disc 1 to rotate the rotating disc 1, and a transferring part 3 for transferring the rotating disc 1 and rotating part 2.

Figure 1A:
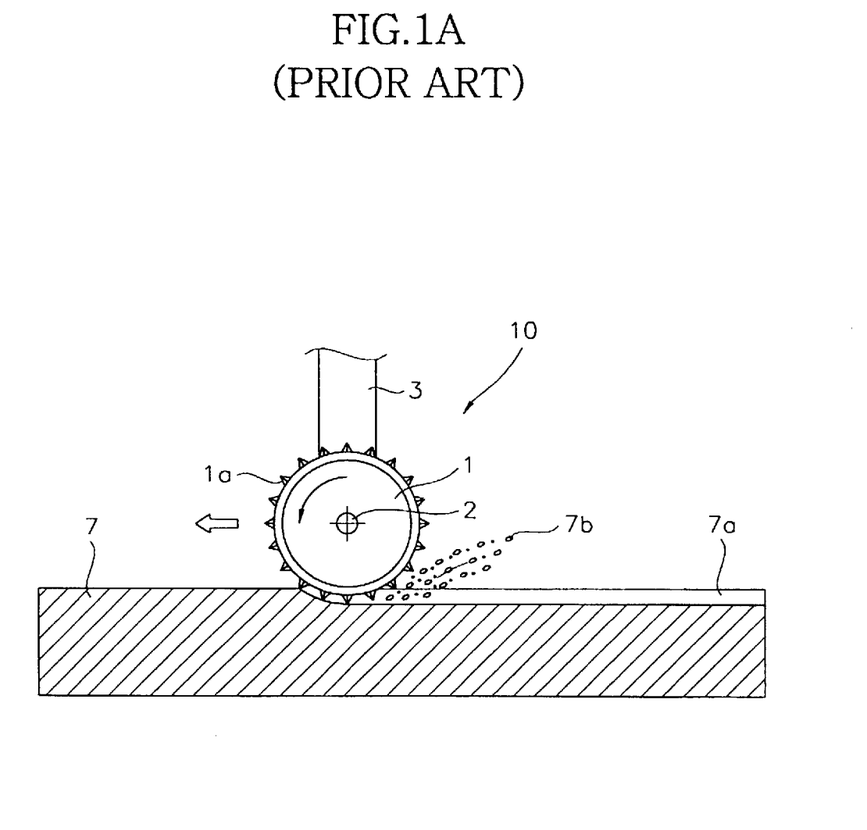
FIGS. 1A to 1E are schematic views showing a conventional method for cutting a glass substrate.
Figure 1B:
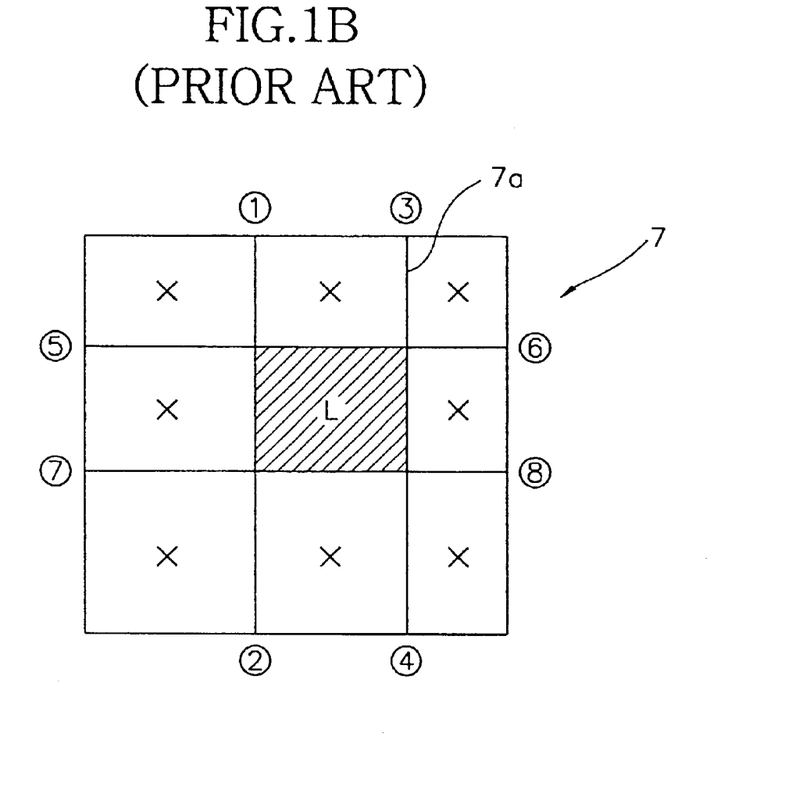
Figure 1C:
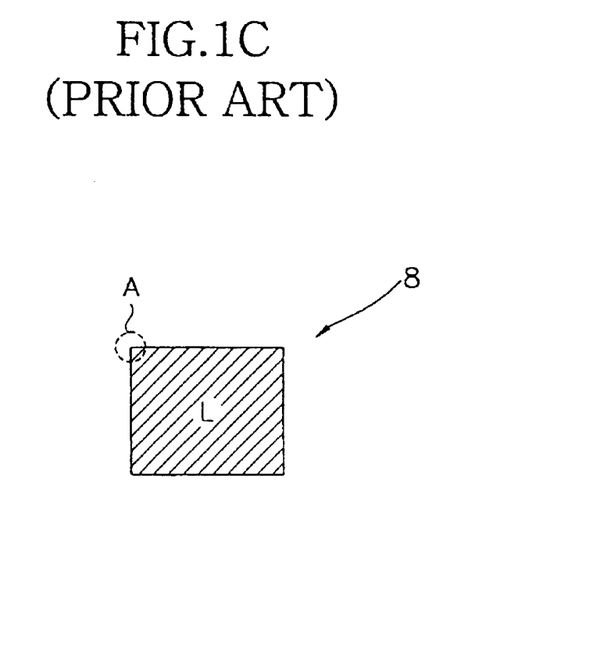

The diamond cutter 10 forms a scribe groove 7a around a target region "L" on a surface of a glass substrate 7. The target region "L" is separated from the glass substrate 7. For instance, when the target region "L" has a rectangular shape, the diamond cutter 10 forms the scribe groove 7a at boundaries of the target region "L" by moving along lines ①-②, ③-④, ⑤-⑥, and ⑦-⑧. By applying a predetermined impact to the portions ("X") around the target region "L", the crack is developed along lines ①-②, ③-④, ⑤-⑥ and ⑦-⑧. Thus, the target region "L" is separated from the glass substrate 7 to form a separated substrate 8.

Figure 1D:
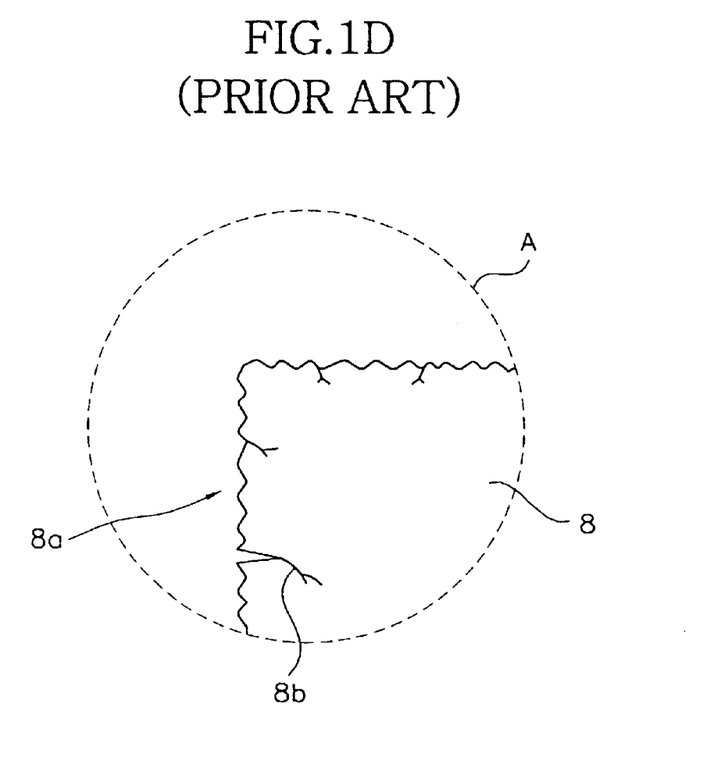
Figure 1E:
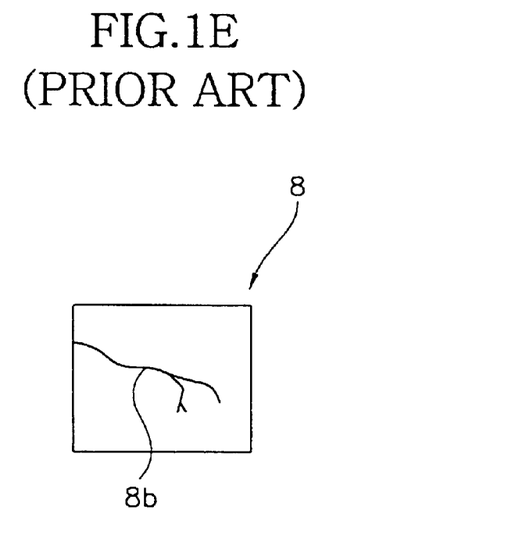

FIG. 1D shows an enlarged structure of an edge (A) of the separated substrate 8. The separated substrate 8 has a crack 8b disposed at a separated surface 8a. The crack 8b may be randomly developed to any place of the separated substrate 8 due to the impact applied to the portion (X), so that the separated substrate 8 may be cut in an undesired form. Also, the conventional cutting method of the glass substrate 8 causes a lot of glass fragments 7b, so that the glass substrate 7 has to be cleaned through a separated process. Further, the glass fragments 7b causes a contamination of peripheral equipments.

BRIEF SUMMARY OF THE INVENTION

The present invention provides a simplified method of cutting a nonmetallic substrate capable of reducing steps and time for cutting a nonmetallic substrate and reducing contaminants of the substrate.

The present invention also provides an apparatus for cutting a nonmetallic substrate capable of reducing steps and time for cutting a nonmetallic substrate and contaminants of the substrate.

In one embodiment of the invention, a method of cutting a nonmetallic substrate comprises applying a laser beam to first cutting lines of a plurality of cells arranged in a matrix configuration on a nonmetallic substrate to separate the cells from the nonmetallic substrate, wherein each of the cells comprises first, second, third, and fourth edge portions, and wherein each of the first cutting lines is formed along the opposite first and second edge portions; and applying the laser beam to second cutting lines of the cells to separate the cells from each other, wherein each of the second cutting lines is formed along the opposite third and fourth edge portions.

In another embodiment of the present invention, a method of cutting a nonmetallic substrate comprises applying a first laser beam to a first cutting line of a cell disposed on a nonmetallic substrate to form a first crack, wherein the cell comprises first, second, third, and fourth edge portions, the first cutting line is formed along the opposite first and second edge portions, and the first crack is formed on the first and second edge portions; applying a second laser beam along a second cutting line by a predetermined distance from a crossing point to form a crossing crack, wherein the second cutting line intersects the first crack and is in contact with the first crack at the crossing point; applying a third laser beam having energy less than energy of the second laser beam on the second cutting line; cooling the second cutting line using a coolant to form a first scribe crack on a portion of the second cutting line; applying the third laser beam on the crossing crack; and cooling the second cutting line using the coolant to form a second scribe crack on a remained portion of the second cutting line.

In a further embodiment, an apparatus for cutting a nonmetallic substrate comprises a first laser supplying part for applying a first laser beam along a cutting line of a nonmetallic substrate by a predetermined distance from a cutting starting point to form an initial crack, wherein edge portions of the nonmetallic substrate are in contact with the cutting line at the cutting starting point; and a scribe crack forming part for applying a second laser beam having energy less than energy of the first laser beam from the initial crack to an end portion of the cutting line, and for cooling the cutting line using a coolant to form a scribe crack on the cutting line.

According to the method and apparatus of the present invention, an initial crack is previously formed on a nonmetallic substrate by cutting the nonmetallic substrate using laser beams and coolant, and a scribe line is formed on the nonmetallic substrate by applying the laser beam to the initial crack. The nonmetallic substrate is cut along the scribe line by rapidly heating and cooling the portion of the scribe line using the laser beam and coolant. Thus, the method may reduce the steps and time for cutting a nonmetallic substrate and contaminants of the nonmetallic substrate.

BRIEF DESCRIPTION OF THE DRAWINGS

The above and other advantages of the present invention will become readily apparent by reference to the following detailed description when considered in conjunction with the accompanying drawings wherein:

FIGS. 3 to 4E are schematic views for illustrating a method of cutting a nonmetallic substrate according to one embodiment of the present invention;

DETAILED DESCRIPTION OF THE INVENTION

Figure 3:
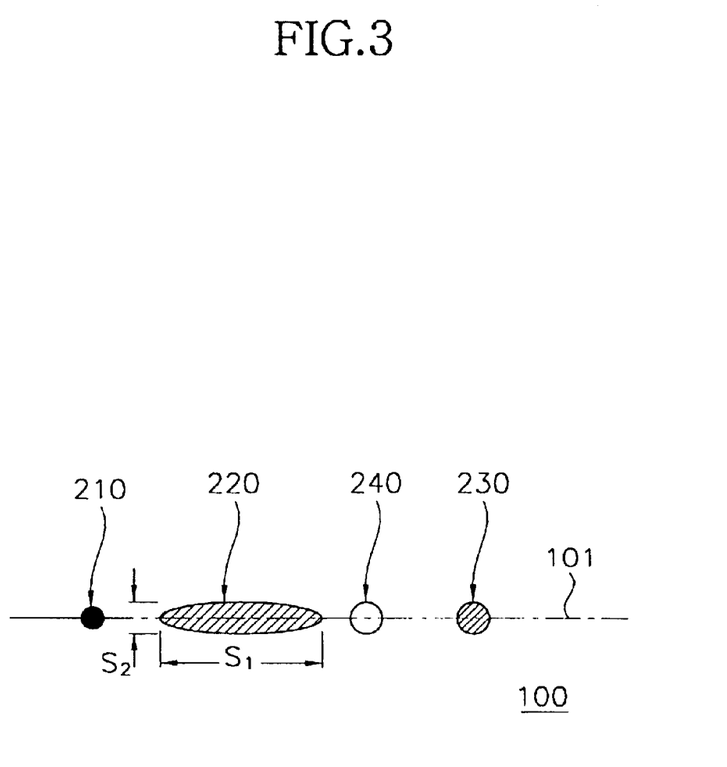
Figure 4A:
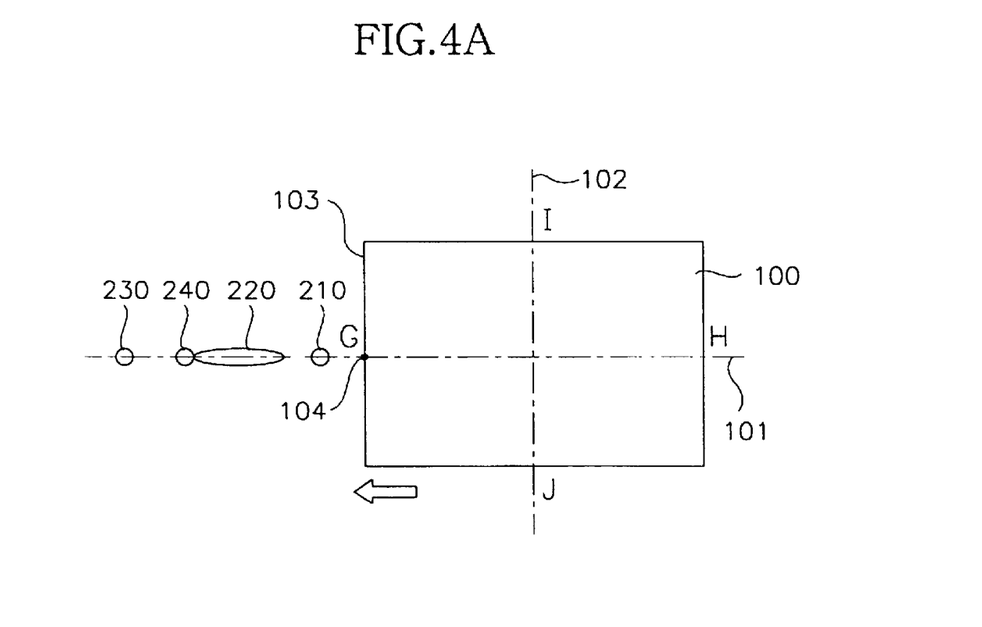
Figure 4B:
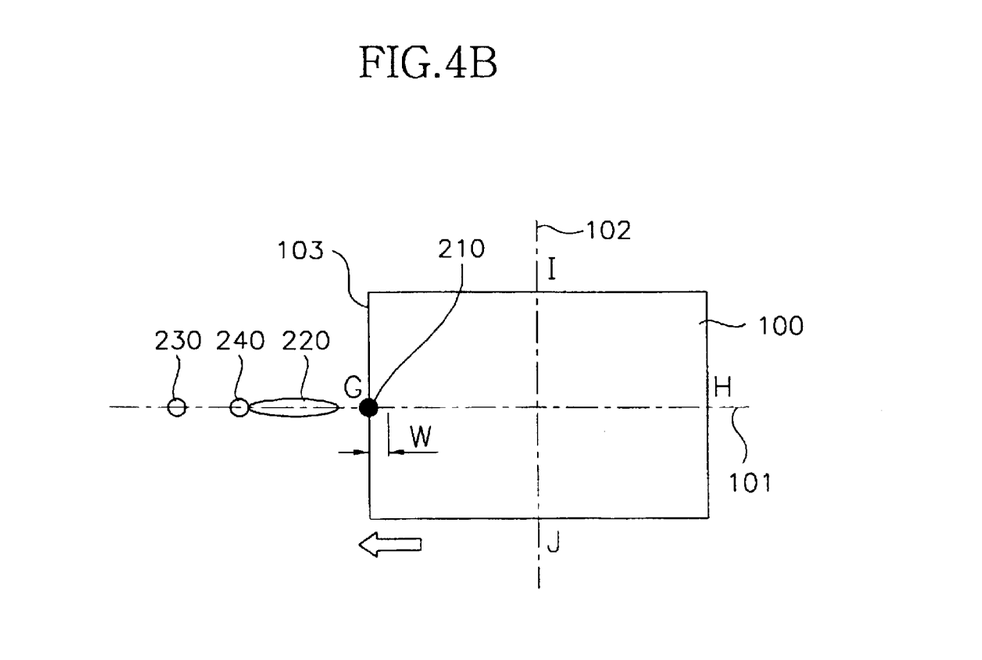
Figure 4C:
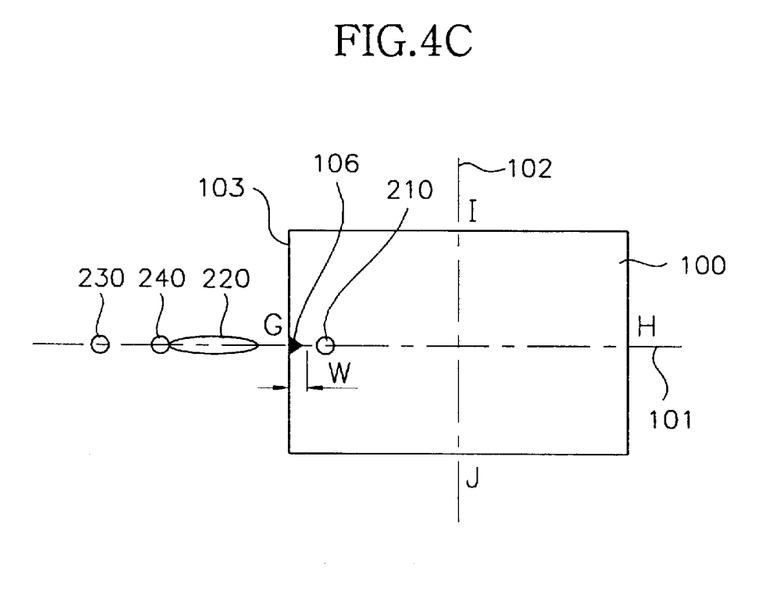
Figure 4D:
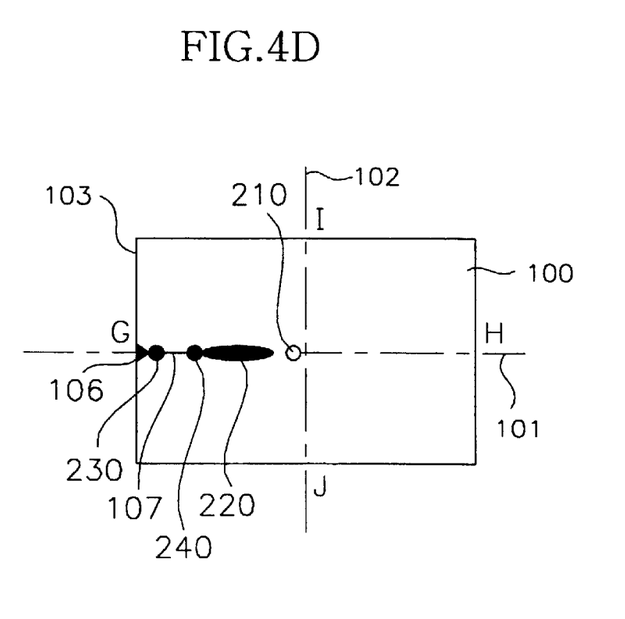
Figure 4E:
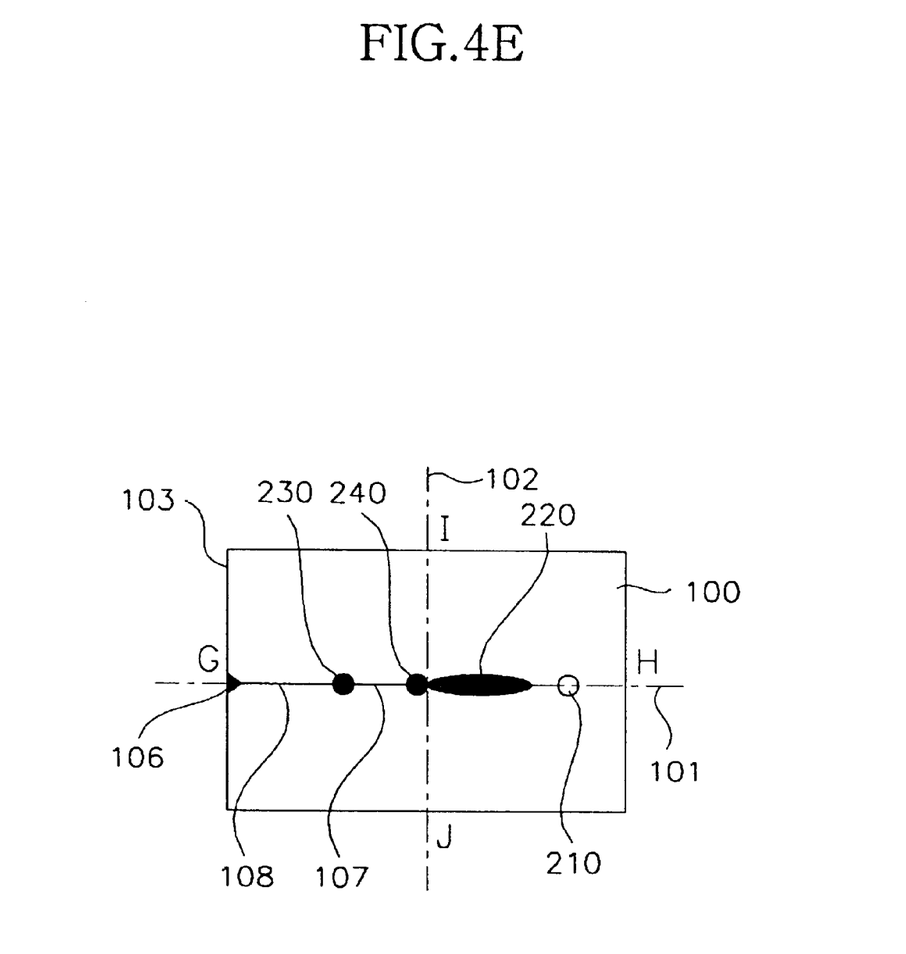
Figure 5A:
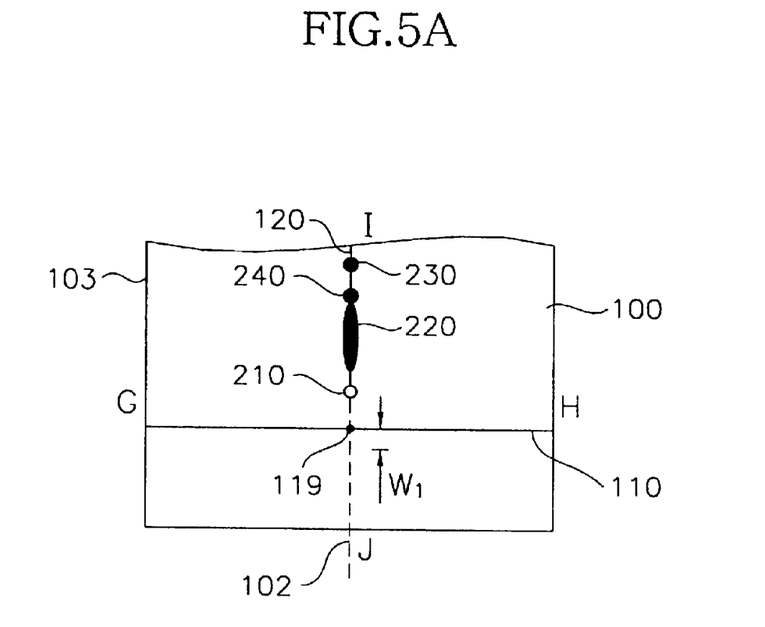
FIGS. 5A to 5C are schematic views for illustrating a method of cutting a nonmetallic substrate having a previously cut surface according to another embodiment of the present invention.
Figure 5B:
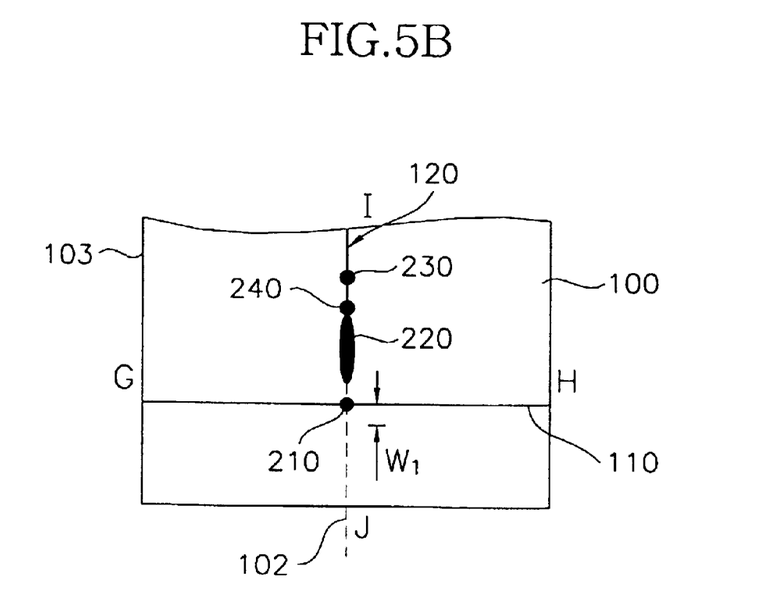
Figure 5C:
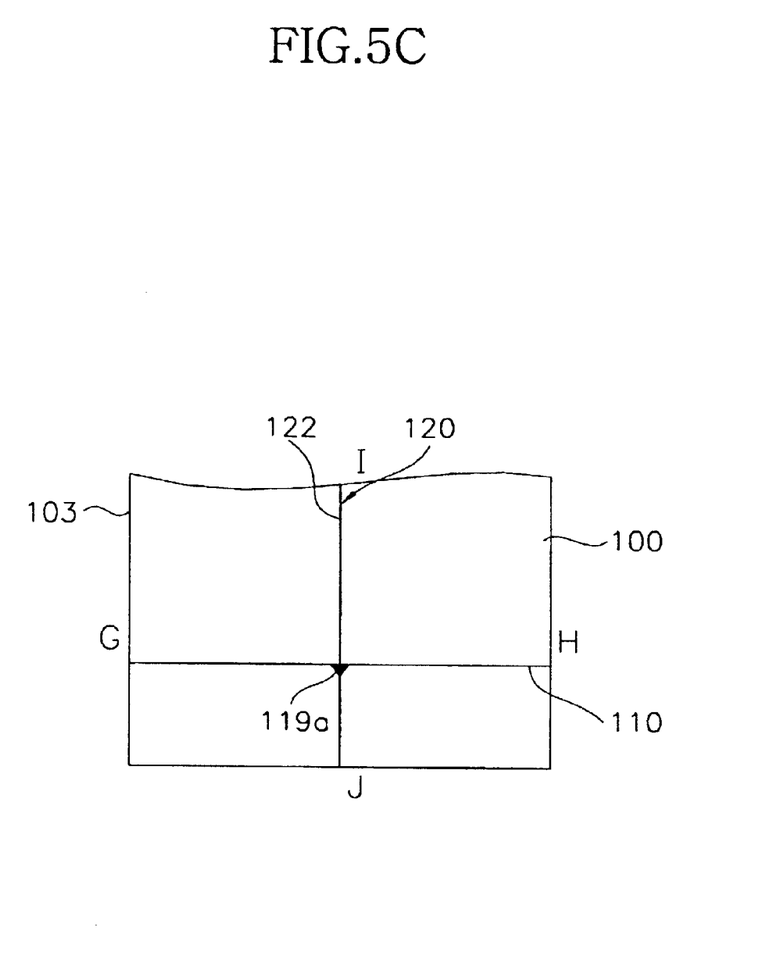

FIGS. 3 to 5 are schematic views for illustrating a method of cutting a nonmetallic substrate according to an embodiment of the present invention.

Referring to FIG. 3, a first laser beam 210, a second laser beam 220, a cooling fluid 240, and a third laser beam 230 are sequentially applied on an imaginary line (referred to as a "first cutting line") 101 of a glass substrate 100. The imaginary line includes a portion of the glass substrate 100 to be cut. By applying the first laser beam 210 on the first cutting line 101, an initial crack and a crossing crack are formed on the glass substrate 100. The initial crack is developed into another crack formed along the first cutting line 101 and the crossing crack crosses the crack previously formed on the glass substrate 100. For example, as shown in FIG. 4E or 5A, the initial crack 106 is developed to a second cutting surface 110 formed from a first cutting surface 103 to an opposite end surface of the first cutting surface 103. The crossing crack makes a third cutting surface 120 to be crossed with the second cutting surface 110. The crossing crack is generally used to more minutely cut the glass substrate 100.

The first laser beam 210 applies a first energy to the glass substrate 100 within a predetermined time to form the initial crack or crossing crack thereon. The first laser beam 210 comprises third harmonic YAG laser beam or a fourth harmonic YAG laser beam. The third and fourth harmonic YAG laser beams have a high frequency compared with a YAG laser generally having a wavelength of 1064 nm.

For example, the third harmonic YAG laser beam for applying the first energy within a predetermined time has a wavelength of 355 nm. Where the glass substrate 100 is, for example, a 1737 GLASS made by SAMSUNG CORNING, LTD., the third harmonic YAG laser beam is absorbed into the glass substrate 100 in a range of about 10 to about 15%. The third harmonic YAG laser beam may apply the first energy to the glass substrate 100 within the predetermined time, even if it has low absorption rate with respect to the glass substrate 100, because the third harmonic YAG laser may be output in a high power. The fourth harmonic YAG laser beam for applying the first energy within the predetermined time has a wavelength of 266 nm. Where the glass substrate 100 is, for example, the 1737 GLASS made by SAMSUNG CORNING, LTD., the fourth harmonic YAG laser beam is absorbed into the glass substrate 100 in a range of about 90% or more. The fourth harmonic YAG laser beam may apply the first energy to the glass substrate 100 within the predetermined time with a low power, because it has a high absorption rate with respect to the glass substrate 100.

Figure 2:
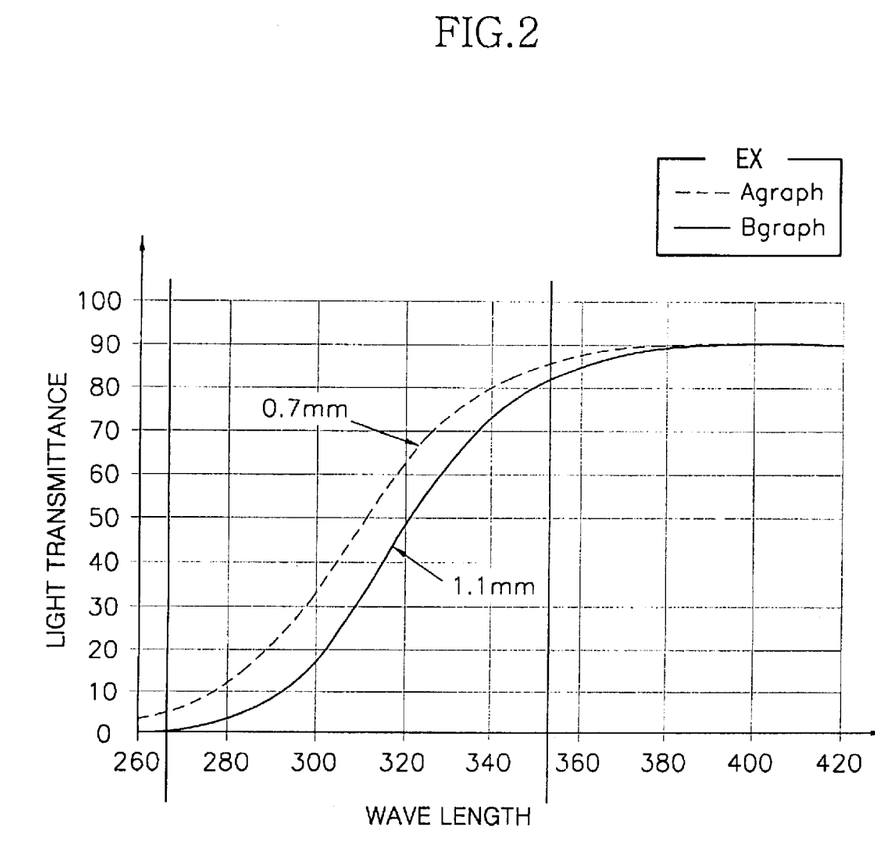
FIG. 2 is a graph showing a light transmittance of a laser beam with respect to wavelength, according to one embodiment of the present invention.

FIG. 2 shows a light transmittance of the YAG laser beam with respect to wavelengths. For example, a graph "A" shows a transmittance of the YAG laser beam with respect to each of wavelengths in case of the glass substrate 100 having a thickness of 0.7 mm and a graph "B" shows a transmittance of the YAG laser beam with respect to each of wavelengths in case of the glass substrate 100 having a thickness of 1.1 mm.

Referring to FIG. 3 again, the second laser beam 220 is applied on the first cutting line 101 following the application of the first laser beam 210. The second laser beam 220 comprises a carbon dioxide laser beam to provide a second energy to the glass substrate 100. The intensity of the second energy is not strong enough to completely cut the glass substrate 100. The second laser beam 220 has a first length S1 in a direction parallel to the first cutting line 101 and a second length S2 in a direction intersecting the first cutting line 101. The second length S2 is shorter than the first length S1, so that the second laser beam 220 has an oval shape.

The cooling fluid 240 is applied on the first cutting line 101 following the application of the second laser beam 220. The cooling fluid 240, for example, has a spot shape. For instance, the cooling fluid 240 comprises various fluids having a temperature lower than that of the first cutting line 101 heated by the second laser beam 220.

The initial crack 106 is developed along the first cutting line 101 due to the applying of the second laser beam 220 and cooling fluid 240, so that a scribe crack 107 having a groove shape is formed on the glass substrate 100. In order to form a second cutting surface 110, the third laser beam 230 is applied to the scribe crack 107. The third laser beam 230 comprises a carbon dioxide laser beam to provide a third energy to the glass substrate 100. The third energy makes the scribe crack 107 to be developed to a cutting direction of the glass substrate 100.

Referring to FIG. 4A, the glass substrate 100 is placed to a predetermined position on a cutting apparatus. The glass substrate 100 is transferred toward a point where the first laser beam 210 is placed. The first laser beam 210, second laser beam 220, and third laser beam 230 are aligned with the first cutting line 101. The first laser beam 210 is applied on an intersecting point 104 between the first cutting surface 103 and first cutting line 101 while the glass substrate 100 is transferred. The first laser beam 210 comprises the fourth harmonic YAG laser beam having the wavelength of 266 nm and the third harmonic YAG laser beam. The fourth harmonic YAG laser beam has an absorption rate lower than that of the fourth harmonic YAG laser beam and a power higher than that of the fourth harmonic YAG laser beam. As shown in FIGS. 4B and 4C, the first laser beam 210 is applied along the first cutting line 101 by a predetermined length "W" from the interesting point 104, so that the initial crack 106 is formed on the glass substrate 100.

The glass substrate 100 is continuously transferred toward a point where the second laser beam 220 is placed. When the initial crack 106 of the glass substrate 100 passes the point where the second laser beam 220 is placed, the second laser beam 220 is applied along the first cutting line 101 on the glass substrate 100. The first cutting line 101 including the initial crack 106 is rapidly heated by the second laser beam 220 and cooled by the cooling fluid 230. The cooling fluid 230 is supplied along the first cutting line 101 following the application of the second laser beam 220. The initial crack 106 is developed along the first cutting line 101 from the point where the cooling fluid 240 is applied, because the second laser beam 220 and cooling fluid 240 are sequentially applied to the first cutting line 101 of the glass substrate 100.

The initial crack 106 is developed to a scribe crack 107 along the first cutting line 101. The scribe crack 107 guides a predetermined portion of the glass substrate 100 to be cut. The scribe crack 107 is transferred to a second cutting portion 108 on the glass substrate 100. For example, the third laser beam 230 is applied on the scribe crack 107 so as to form the second cutting portion 108 on the glass substrate 100. As the scribe crack 107 is heated by the third laser beam 230, a volume of the scribe crack 107 increases. The volume increase of the scribe crack 107 generates a heat-stress, the heat-stress develops the scribe crack 107 to the second cutting portion 108. When the glass substrate 100 is completely cut by developing the scribe crack 107, the scribe crack 107 is replaced with the second cutting portion 108, thereby forming the second cutting surface 110.

FIGS. 5A to 5C illustrate a method of cutting the glass substrate 100 having the second cutting surface 110 according to the present invention.

A scribe line is formed on a second cutting line 102 (I~J) intersecting the second cutting surface 110 by the second laser beam 220 and cooling fluid 240, and a third cutting surface 120 is formed by the third laser beam 230. The first laser beam 210 is close to the second cutting surface 110, as the glass substrate 100 is transferred.

When an intersecting point 119 between the second cutting surface 110 and second cutting line 102 is coincided with a place of the first laser beam 210, the first laser beam 210 starts to apply the first energy on the glass substrate 100 to form a crossing crack 119a on the second cutting line 102 by a distance W1 from the interesting point 119. The first laser beam 210 may use the third or fourth harmonic YAG laser beams. The third cutting surface 120 is cut along the second cutting line 102 until the surface 120 arrives at the intersecting point 119. The third cutting surface 120 is continuously cut along the crossing crack 119a by the second laser beam 120 and cooling fluid 140. Thus, the third cutting surface 120 is formed on the glass substrate 100 with intersecting the second cutting surface 110 on the glass substrate 100, as shown in FIG. 5C.

FIGS. 6A to 6D are schematic views for illustrating a method of cutting cells according to another embodiment of the present invention.

Figure 6A:
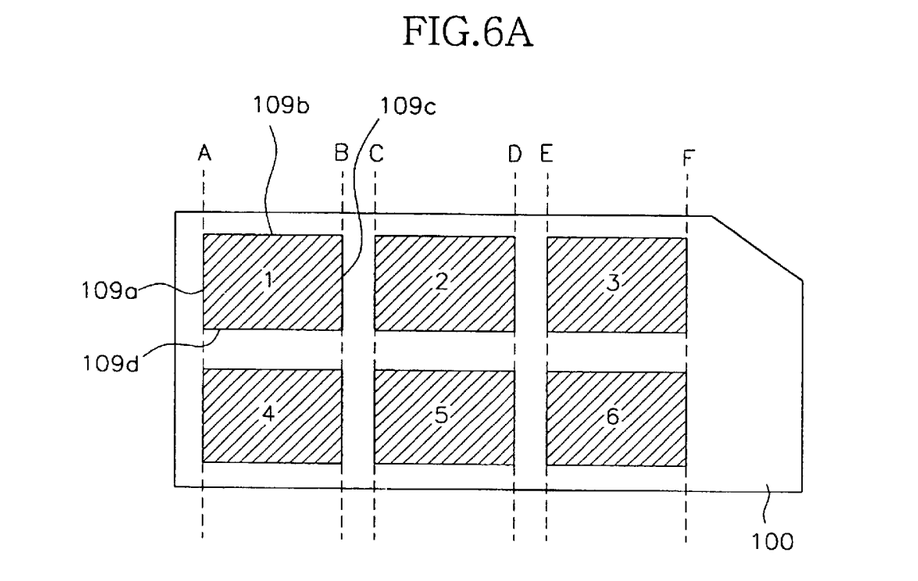
FIGS. 6A to 6D are schematic views for illustrating a method of cutting cells according to another embodiment of the present invention.

Assume that a glass substrate 100 is provided with first to sixth LCD cells 1, 2, 3, 4, 5 and 6. The glass substrate 100 comprises a TFT substrate, a color filter substrate or the like. Each of the first to sixth cells 1, 2, 3, 4, 5 and 6 has four edge portions, i.e., first to fourth edge portions 109a, 109b, 109c and 109d. The first and third edge portions 109a and 109c of the first and fourth cells 1 and 4 are cut along cutting lines "A" and "B", the first and third edge portions of the second and fifth cells 2 and 5 are cut along cutting lines "C" and "D", and the first and third edge portions of the third and sixth cells 3 and 6 are cut along cutting lines "E" and "F".

Figure 6B:
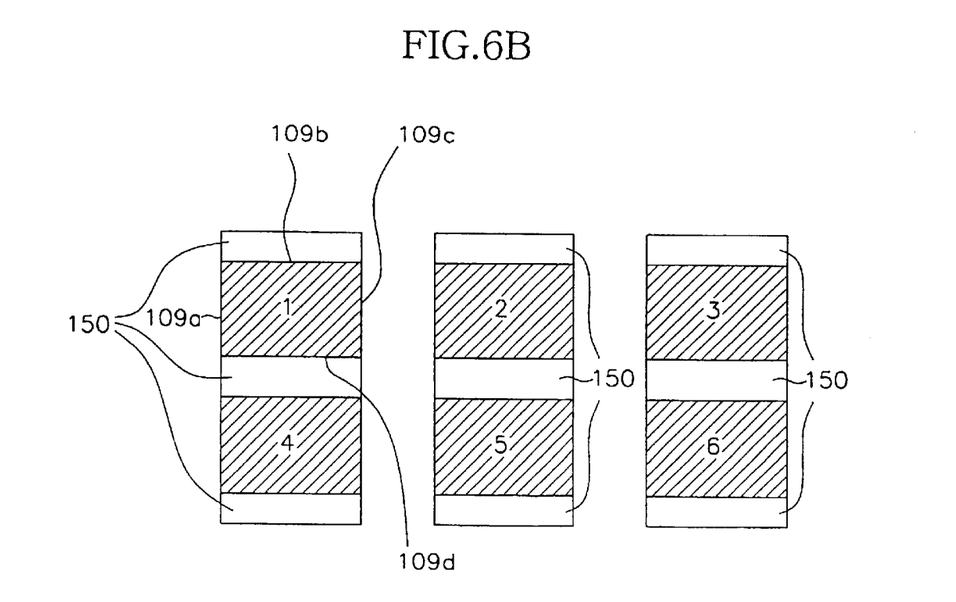

First initial cracks are formed by the first laser beam 210 on places where the cutting lines "A", "B", "C", "D", "E" and "F" are in contact with the glass substrate 100. By heating the first initial cracks by the second laser beam 220 and cooling the heated first initial cracks by the cooling fluid 240, first scribe lines are formed along the cutting lines "A", "B", "C", "D", "E" and "F". The third laser beam 230 is applied on the first scribe lines so as to separate the cells 1, 2, 3, 4, 5, and 6 from the glass substrate 100.

The first to sixth cells 1, 2, 3, 4, 5 and 6 are separated from the glass substrate 100 into three parts. For example, three pairs of cells, e.g., the first and fourth cells 1 and 4, second and fifth cells 2 and 5, and third and sixth cells 3 and 6, are formed. The portions of the glass substrate 100 at the second and fourth edge portions 109b and 109d are removed to separate the first to sixth cells 1, 2, 3, 4, 5, and 6 from the glass substrate 100 one by one.

Figure 6C:
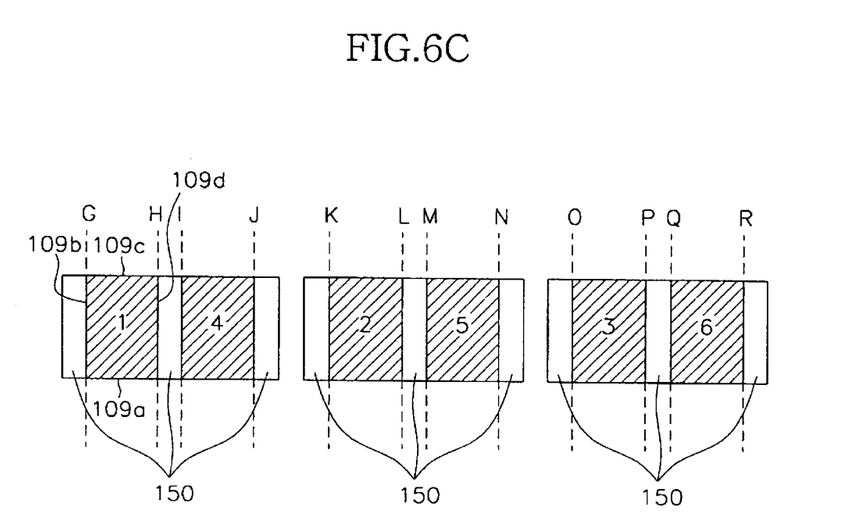
Figure 6D:
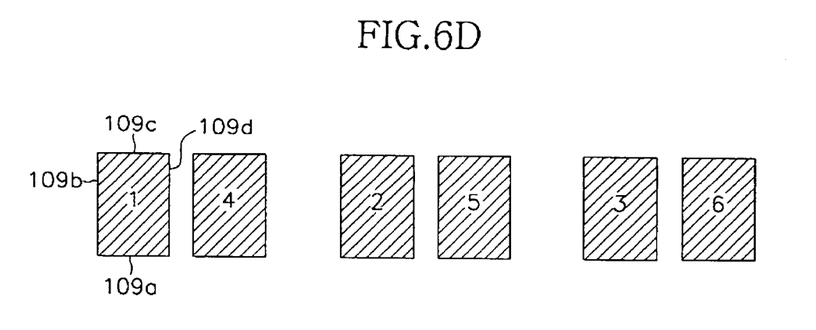

For instance, the second and fourth edge portions 109b and 109d of the first cell 1 are cut along cutting lines "G" and "H", the second and fourth edge portions 109b and 109d of the fourth cell 4 are cut along cutting lines "I" and "J", the second and fourth edge portions 109b and 109d of the second cell 2 are cut along cutting lines "K" and "L", the second and fourth edge portions 109b and 109d of the fifth cell 5 are cut along cutting lines "M" and "N", the second and fourth edge portions 109b and 109d of the third cell 3 are cut along cutting lines "O" and "P", and the second and fourth edge portions 109b and 109d of the sixth cell 6 are cut along cutting lines "Q" and "R", Second initial cracks are provided to the portions where the cutting lines "H", "I", "J", "K", "L", "M", "N", "O", "P", "Q" and "R" are in contact with the glass substrate 100. By heating the second initial cracks by the second laser beam 220 and cooling the heated second initial cracks by the cooling fluid 240, second scribe lines are formed along the cutting lines "G", "H", "I", "J", "K", "L", "M", "N", "O", "P", "Q" and "R". The third laser beam 230 is applied on the second scribe lines so as to separate the cells 1, 2, 3, 4, 5 and 6 from each other.

Figure 7:
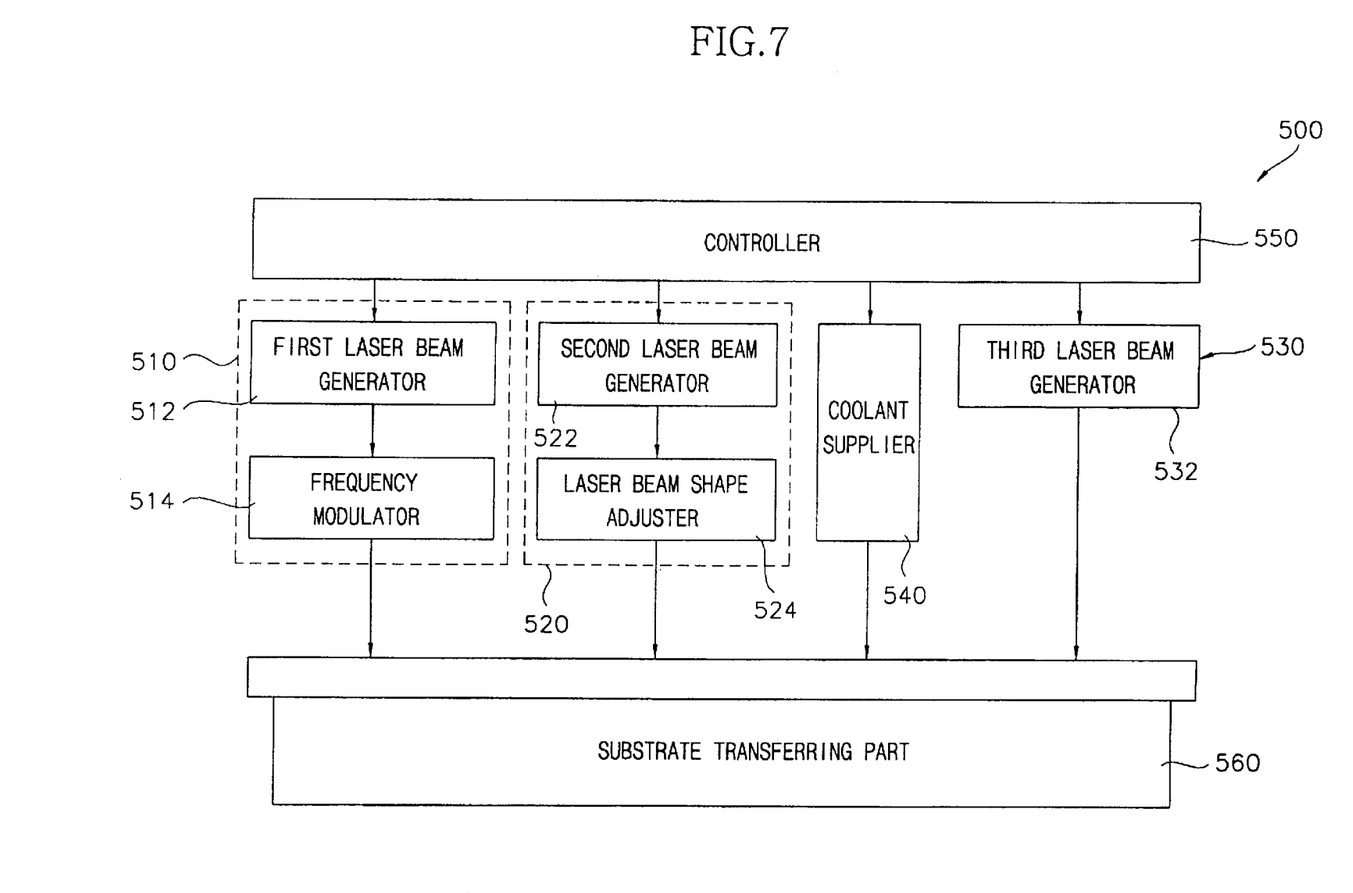
FIG. 7 is a block diagram showing an apparatus for cutting a nonmetallic substrate according to further embodiment of the present invention.

FIG. 7 is a block diagram showing an apparatus for cutting a nonmetallic substrate according to a further embodiment of the present invention.

Referring to FIG. 7, a nonmetallic substrate cutting apparatus 500 comprises a first laser beam supplying part 510, a second laser beam supplying part 520, a coolant supplier 540, a third laser beam supplying part 530, a controller 550, and a substrate transferring part 560.

The first laser beam supplying part 510 comprises a first laser beam generator 512 and a frequency modulator 514. The first laser beam generator 512 generates a first laser beam such as a YAG laser beam having a wavelength of 1064 nm and supplies the first laser beam to the glass substrate 100. The frequency modulator 514 modulates the first laser beam. For example, the YAG laser beam having the wavelength of 1064 nm is modulated into a YAG laser beam having a wavelength of 266 nm or 355 nm. In a preferred embodiment of the present invention, the first laser beam comprises a fourth harmonic YAG laser beam having the wavelength of 266 nm. The first laser beam generator 512 is applied on the glass substrate 100 so as to form a crossing crack or initial crack.

The second laser beam supplying part 520 comprises a second laser beam generator 522 and a laser beam shape adjuster 524. The second laser beam generator 522 generates a second laser beam such as a carbon dioxide laser beam and applies the second laser beam to the glass substrate 100. The laser beam shape adjuster 524 adjusts an entire shape of the second laser beam. For example, the laser beam shape changes the circle shape to the oval shape of the second laser beam. The laser beam shape adjuster 524 may comprise a lens group having a convex lens and a concave lens.

The coolant supplier 540 supplies a cooling fluid such as a coolant in a predetermined pressure and temperature to the glass substrate 100. The third laser beam supplying part 530 may comprise a third laser beam generator 532 for generating a third laser beam such as a carbon dioxide laser beam and supplying the third laser beam to the glass substrate 100.

A method of cutting a nonmetallic substrate according to preferred embodiments of the present invention previously forms an initial crack on a glass substrate by applying a laser beam and coolant. The initial crack is developed to a scribe crack in response to the applying of the laser beam. The glass substrate is cut along the scribe crack by rapidly heating and cooling the portion of the scribe crack using the laser beam and coolant. Thus, the method of the present invention may reduce steps and time for cutting the glass substrate, and contaminants of the glass substrate.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of cutting a nonmetallic substrate, comprising:
    applying a laser beam to first cutting lines of a plurality of cells arranged in a matrix configuration on a nonmetallic substrate to separate the cells from the nonmetallic substrate, wherein each of the cells comprises first, second, third, and fourth edge portions, and wherein each of the first cutting lines is formed along the opposite first and second edge portions; and
    applying the laser beam to second cutting lines of the cells to separate the cells from each other, wherein each of the second cutting lines is formed along the opposite third and fourth edge portions.

2. The method of claim 1, wherein said separating the cells from the nonmetallic substrate comprises:
    applying a first laser beam along the first cutting line by a predetermined distance from a cutting starting point to form an initial crack on the first cutting line, wherein the first and second edge portions are in contact with the first cutting line at the cutting starting point;
    applying a second laser beam from the initial crack to an end portion of the first cutting line, wherein the second laser beam has energy less than energy of the first laser beam;
    cooling the first cutting line using a coolant to form a scribe crack on the first cutting line; and
    applying a third laser beam to the scribe crack to form a cutting surface along the first cutting line.

3. The method of claim 2, wherein the first laser beam has an absorption rate of a wavelength with respect to the nonmetallic substrate in a range of about 90% or more.

4. The method of claim 3, wherein the nonmetallic substrate is a glass substrate and the first laser beam is a fourth harmonic YAG laser having a wavelength of 266 nm.

5. The method of claim 2, wherein the first laser beam has an absorption rate of a wavelength with respect to the nonmetallic substrate in a range of about 10% to about 15%.

6. The method of claim 5, wherein the nonmetallic substrate is a glass substrate and the first laser beam is a third harmonic YAG laser having a wavelength of 355 nm.

7. The method of claim 1, wherein said separating the cells from each other comprises:
    applying a first laser beam along the second cutting line by a predetermined distance from a cutting starting point to form an initial crack on the second cutting line, wherein the third and fourth edge portions are in contact with the second cutting line at the cutting starting point;
    applying a second laser beam from the initial crack to an end portion of the second cutting line, wherein the second laser beam has energy less than energy of the first laser beam; and
    cooling the second cutting line using a coolant to form a scribe crack on the second cutting line.

8. The method of claim 7, further comprising the step of applying a third laser beam to the scribe crack to form a cutting surface along the second cutting line.

9. A method of cutting a nonmetallic substrate, comprising:
    applying a first laser beam to a first cutting line of a cell disposed on a nonmetallic substrate to form a first crack, wherein the cell comprises first, second, third, and fourth edge portions, the first cutting line is formed along the opposite first and second edge portions, and the first crack is formed on the first and second edge portions;
    applying a second laser beam along a second cutting line by a predetermined distance from a crossing point to form a crossing crack, wherein the second cutting line intersects the first crack and is in contact with the first crack at the crossing point;
    applying a third laser beam having energy less than energy of the second laser beam on the second cutting line;
    cooling the second cutting line using a coolant to form a first scribe crack on a portion of the second cutting line;
    applying the third laser beam on the crossing crack; and
    cooling the second cutting line using the coolant to form a second scribe crack on a remained portion of the second cutting line.

10. The method of claim 9, further comprising the step of applying a fourth laser beam to the first and second scribe cracks to form a cutting surface along the first and second scribe cracks.

11. The method of claim 9, wherein the nonmetallic substrate is a glass substrate and the second laser beam is a fourth harmonic YAG laser having a wavelength of 266 nm.

12. The method of claim 9, wherein the nonmetallic substrate is a glass substrate and the second laser beam is a third harmonic YAG laser having a wavelength of 355 nm.

13. An apparatus for cutting a nonmetallic substrate, comprising:
    a first laser supplying part for applying a first laser beam along a cutting line of a nonmetallic substrate by a predetermined distance from a cutting starting point to form an initial crack, wherein edge portions of the nonmetallic substrate are in contact with the cutting line at the cutting starting point; and
    a scribe crack forming part for applying a second laser beam having energy less than energy of the first laser beam from the initial crack to an end portion of the cutting line, and for cooling the cutting line using a coolant to form a scribe crack on the cutting line.

14. The apparatus of claim 13, further comprising a third laser beam supplying part for applying a third laser beam to the scribe crack to form a cutting surface along the cutting line.

15. The apparatus of claim 13, wherein the first laser beam has an absorption rate of a wavelength with respect to the nonmetallic substrate in a range of about 90% or more.

16. The apparatus of claim 15, wherein the nonmetallic substrate is a glass substrate and the first laser beam is a fourth harmonic YAG laser having a wavelength of 266 nm.

17. The apparatus of claim 13, wherein the first laser beam has an absorption rate of a wavelength with respect to the nonmetallic substrate in a range of about 10% to about 15%.

18. The apparatus of claim 17, wherein the nonmetallic substrate is a glass substrate and the first laser beam is a third harmonic YAG laser having a wavelength of 355 nm.

19. The apparatus of claim 13, wherein the second and third laser beams are a carbon dioxide laser beam, respectively.

* * * * *